United States Patent
Badiru et al.

(10) Patent No.: US 9,776,657 B1
(45) Date of Patent: Oct. 3, 2017

(54) METHODS AND SYSTEMS FOR STEERING SYSTEM INTEGRITY TESTING

(71) Applicant: GM GLOBAL TECHNOLOGY OPERATIONS LLC, Detroit, MI (US)

(72) Inventors: Ibrahim A. Badiru, Novi, MI (US); John T. Zuzelski, Clarkston, MI (US); Scott R. Kloess, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/228,069

(22) Filed: Aug. 4, 2016

(51) Int. Cl.
| | |
|---|---|
| *B62D 5/04* | (2006.01) |
| *B62D 6/00* | (2006.01) |
| *B62D 6/10* | (2006.01) |
| *G07C 5/08* | (2006.01) |
| *G01M 17/06* | (2006.01) |

(52) U.S. Cl.
CPC ........... *B62D 5/0481* (2013.01); *B62D 6/006* (2013.01); *B62D 6/10* (2013.01); *G01M 17/06* (2013.01); *G07C 5/0808* (2013.01); *G07C 5/0816* (2013.01)

(58) Field of Classification Search
CPC ...... B62D 5/0481; B62D 55/04; B62D 6/006; B62D 6/10; B60K 28/10; G06F 7/00; G01M 17/013; G01M 17/06; G07C 5/0808; G07C 5/0816
USPC ....................................................... 701/32.8
See application file for complete search history.

(56) References Cited

U.S. PATENT DOCUMENTS

| | | | | |
|---|---|---|---|---|
| 4,828,065 A | * | 5/1989 | Ishihara | B62D 6/02 180/422 |
| 5,201,382 A | * | 4/1993 | Edahiro | B60K 28/16 180/197 |
| 6,579,930 B2 | * | 6/2003 | Herberger, Sr. | B60C 1/0016 152/209.5 |
| 6,723,777 B2 | * | 4/2004 | Herberger, Sr. | B60C 1/0016 152/209.5 |
| 7,546,890 B2 | * | 6/2009 | Grobler | B62D 49/0635 180/9.21 |
| 8,146,411 B2 | * | 4/2012 | Burgess | G09B 9/02 73/115.07 |
| 8,244,442 B2 | * | 8/2012 | Craig | B60T 8/1708 701/48 |
| 8,527,177 B2 | * | 9/2013 | Linda | B60L 3/10 701/74 |
| 9,014,916 B2 | * | 4/2015 | Tokimasa | B60W 50/045 701/41 |

* cited by examiner

*Primary Examiner* — McDieunel Marc

(57) ABSTRACT

In one embodiment, a method for steering system integrity testing includes positioning the vehicle with the second traction wheel within a first constraint; applying mechanical load to the first traction wheel; receiving data corresponding to a steering system operating condition; positioning the vehicle with the first traction wheel within a second constraint; applying mechanical load to the second traction wheel; receiving data corresponding to a steering system operating condition; positioning the vehicle with the first and second traction wheels on respective first and second friction surfaces; applying mechanical load to the first and second traction wheels; receiving data corresponding to a steering system operating condition; transmitting the data to a processor; and determining, via the processor, a health status of the steering system based on the data.

20 Claims, 6 Drawing Sheets

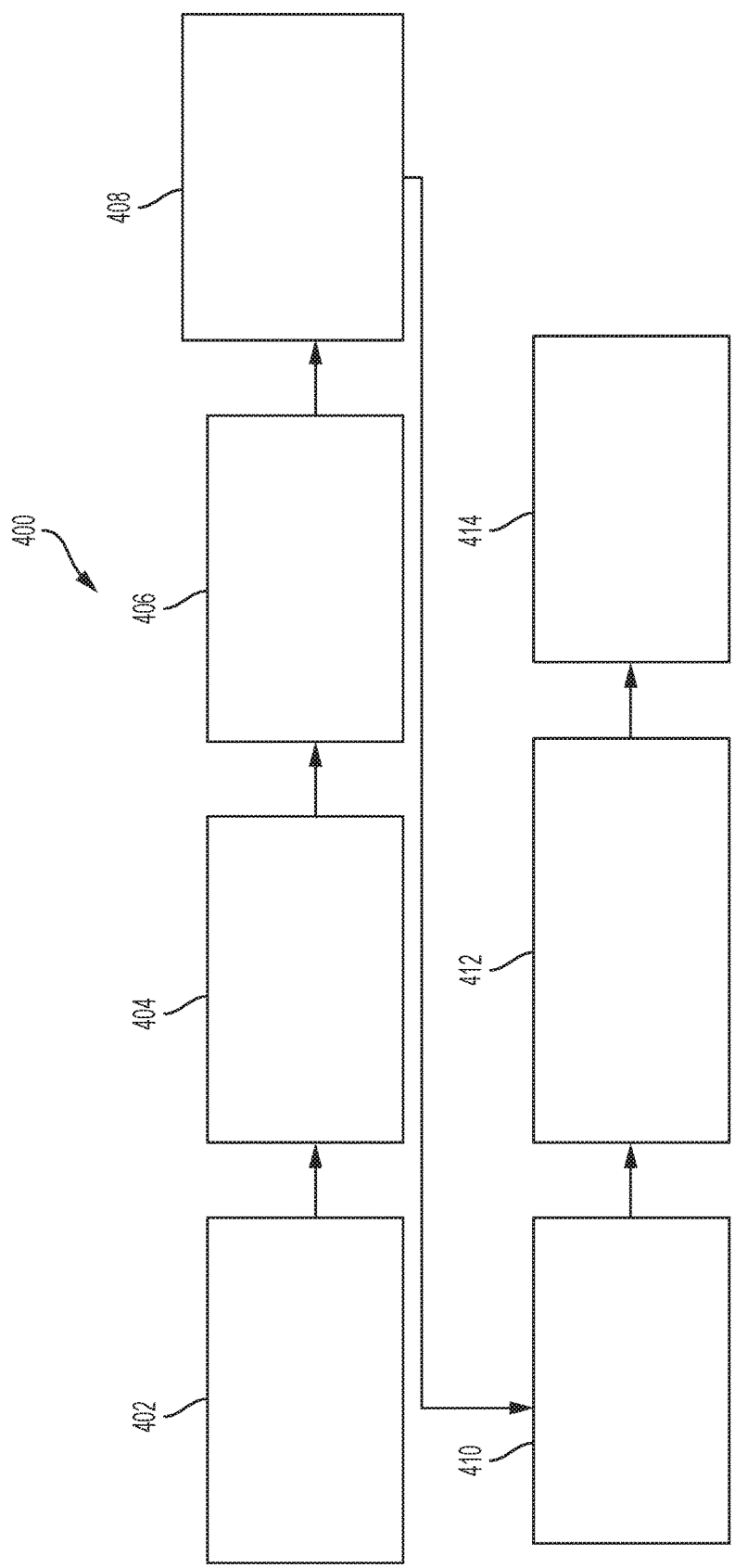

METHODS AND SYSTEMS FOR STEERING SYSTEM INTEGRITY TESTING

TECHNICAL FIELD

The present disclosure generally relates to a steering system of a vehicle, and more particularly relates to methods and systems for monitoring vehicle steering systems to determine a health of the steering system.

INTRODUCTION

A steering system of a vehicle allows a driver to steer the front wheels of the vehicle. The steering system may be an electric power steering system that uses an electric motor to provide a steering assist to a driver of the vehicle, thereby reducing effort by the driver in steering the vehicle.

In some instances, components of the steering system of the vehicle may become electrically or mechanically compromised or degraded due to rough road conditions, component wear and tear, or other factors. As the operation of modern vehicles becomes more automated, i.e. able to provide driving control with less and less driver intervention, the diagnosis of possible degradation conditions with vehicle systems, such as steering systems, may be delayed or missed, due to reduced human operation of the vehicle.

Accordingly, it is desirable to provide methods and systems for monitoring the steering system, particularly for autonomous, or nearly autonomous vehicles in which the driver performs less direct operation of the vehicle. Furthermore, other desirable features and characteristics of the present invention will become apparent from the subsequent detailed description of the invention and the appended claims, taken in conjunction with the accompanying drawings and this background of the invention.

SUMMARY

Embodiments according to the present disclosure provide a number of advantages. For example, embodiments according to the present disclosure may enable independent validation of vehicle steering systems to aid in diagnosis of possible conditions in the vehicle steering system using regular and repeatable testing procedures. Embodiments according to the present disclosure may thus provide more robust diagnosis of possible steering system conditions, increasing customer satisfaction.

In one aspect, a method of verifying health and functionality of a steering system of a vehicle is disclosed. The vehicle steering system includes a first traction wheel, a second traction wheel, and at least one sensor and the method includes the steps of positioning the vehicle with the first traction wheel on a first bearing surface and the second traction wheel within a first constraint; applying a first mechanical load to the first traction wheel; receiving, from the at least one sensor, first condition data corresponding to a first steering system condition; positioning the vehicle with the first traction wheel within a second constraint and the second traction wheel on a second bearing surface; applying a second mechanical load to the second traction wheel; receiving, from the at least one sensor, second condition data corresponding to a second steering system condition; positioning the vehicle with the first and second traction wheels on respective first and second friction surfaces; applying a third mechanical load to the first and second traction wheels; receiving, from the at least one sensor, third condition data corresponding to a third steering system condition; transmitting the first, second, and third condition data to a processor; and determining, via the processor, a health status of the steering system based on the first, second, and third condition data.

In some embodiments, the first, second, and third steering system conditions include one or more of a steering wheel angle, a steering motor torque, and a steering motor current. In some embodiments, the first, second, and third condition data indicate current operating conditions of the steering system of the vehicle. In some embodiments, determining the health status of the steering system includes determining a functionality of at least one component of the steering system.

In some embodiments, the method further includes the step of processing the first condition data to determine a first steering load path stiffness. In some embodiments, the method further includes the step of processing the second condition data to determine a second steering load path stiffness. In some embodiments, the method further includes the step of processing the third condition data to determine a motor torque ripple magnitude, a peak steering angle, and a peak motor torque.

In some embodiments, determining the health status of the steering system includes checking for at least one service condition of the steering system. In some embodiments, the at least one service condition includes excess stiffness, asymmetry of the steering system, and stick-slip. In some embodiments, the method further includes the step of generating a diagnostic code if at least one service condition is detected. In some embodiments, wherein the first constraint includes a first pair of parallel rails, the second constraint includes a second pair of parallel rails, and the first pair of rails is laterally spaced apart from and parallel to the second pair of rails.

In another aspect, a device to verify health and functionality of a vehicle steering system is disclosed. The device includes a first pair of parallel rails and a second pair of parallel rails, wherein the first pair of rails is laterally spaced apart from and parallel to the second pair of rails, the first pair of rails defining a first wheel path and the second pair of rails defining a second wheel path, each of the first wheel path and the second wheel path extending in a longitudinal direction; a first bearing surface aligned with the first wheel path and interrupting the first pair of rails such that the first pair of rails are discontinuous; a second bearing surface aligned with the second wheel path and interrupting the second pair of rails such that the second pair of rails are discontinuous, the second bearing surface longitudinally and laterally offset from the first bearing surface; and a first friction surface and a second friction surface, wherein the first friction surface is aligned with the first wheel path and longitudinally spaced from the first bearing surface and the second friction surface is aligned with the second wheel path and longitudinally spaced from the second bearing surface and the first and second friction surfaces are longitudinally aligned.

In some embodiments, the first bearing surface defines a first test area and the second bearing surface defines a second test area. In some embodiments, the first and second friction surfaces define a third test area. In some embodiments, the device further includes a controller configured to generate a signal when the vehicle is positioned in the first test area to instruct the vehicle to apply a first mechanical load to the steering system. In some embodiments, the controller is configured to generate a signal when the vehicle is positioned in the second test area to instruct the vehicle to apply a second mechanical load to the steering system. In some embodiments, the controller is configured to generate a signal when the vehicle is positioned in the third test area to instruct the vehicle to apply a third mechanical load to the steering system.

In yet another aspect, an autonomous vehicle configured to autonomously perform a method of verifying health and functionality of a steering system of the vehicle is disclosed. The steering system includes a first traction wheel, a second traction wheel, and at least one sensor, and the method includes the steps of positioning the vehicle within a first test area, wherein the first traction wheel is constrained; applying a first mechanical load to the second traction wheel; receiving, from the at least one sensor, first data corresponding to a first characteristic of the steering system; positioning the vehicle within a second test area, wherein the second traction wheel is constrained; applying a second mechanical load to the first traction wheel; receiving, from the at least one sensor, second data corresponding to a second characteristic of the steering system; positioning the vehicle within a third test area, wherein both of the first and second traction wheels are steerable; applying a third mechanical load to the first and second traction wheels; receiving, from the at least one sensor, third data corresponding to a third characteristic of the steering system; transmitting the first, second, and third data to a processor; and determining, via the processor, a health status of the steering system based on the first, second, and third data.

In some embodiments, the characteristic of the steering system includes a steering wheel angle, a steering motor torque, and a steering motor current. In some embodiments, positioning the vehicle within the first test area includes positioning the first traction wheel between a first pair of rails and positioning the vehicle within the second test area includes positioning the second traction wheel between a second pair of rails.

The above advantages and other advantages and features of the present disclosure will be apparent from the following detailed description of exemplary embodiments when taken in connection with the accompanying drawings.

BRIEF DESCRIPTION OF THE DRAWINGS

The present disclosure will be described in conjunction with the following figures, wherein like numerals denote like elements.

FIG. 6 is a flow chart of a test procedure and analysis sequence to validate both sides of a vehicle steering system, according to an embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. For example, while embodiments of the present disclosure are discussed in reference to an autonomous or semi-autonomous vehicle, the embodiments discussed herein may also be used with non-autonomous vehicles.

Figure 1:
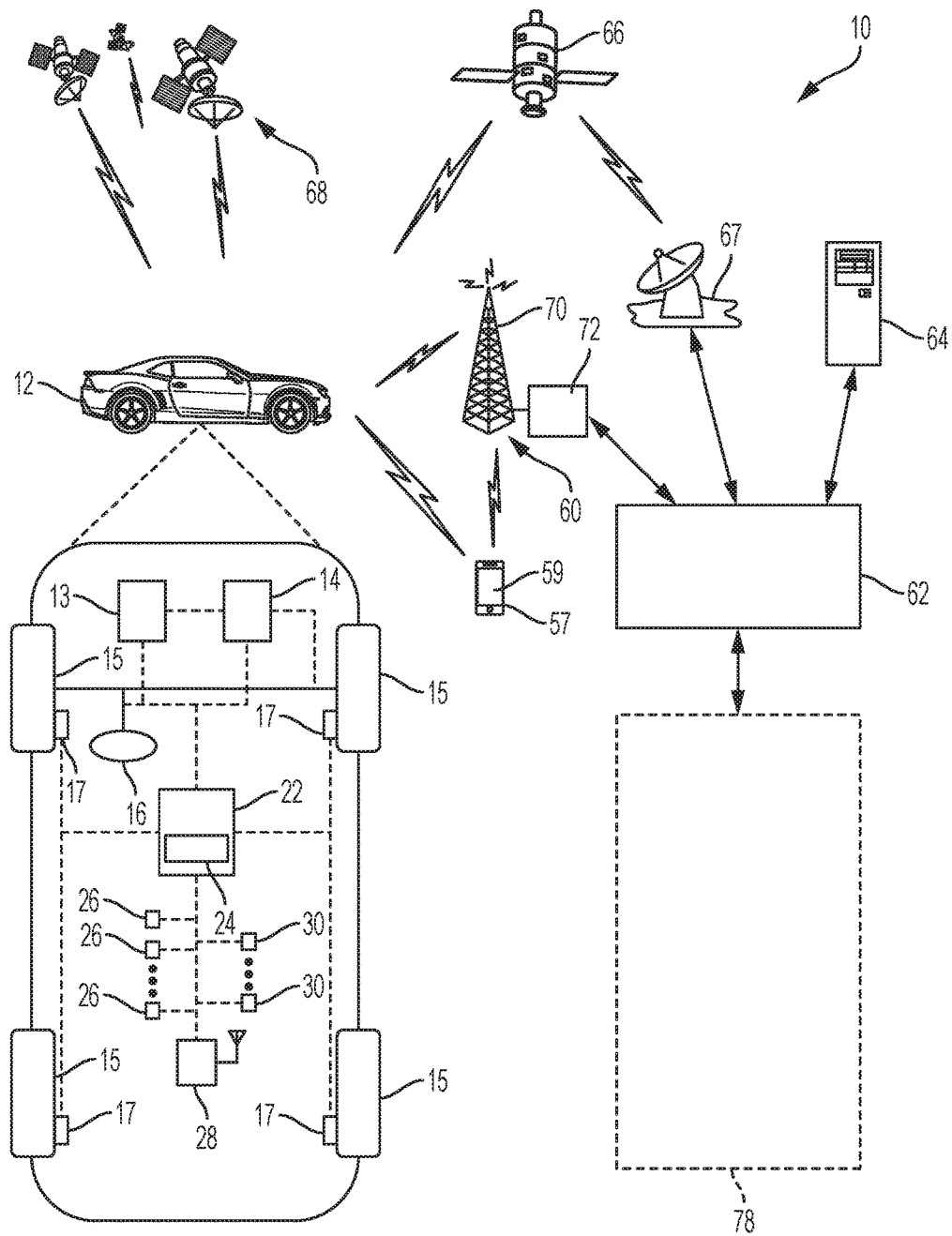
FIG. 1 is a schematic diagram of a communication system including an autonomously controlled vehicle, according to an embodiment.

FIG. 1 schematically illustrates an operating environment that includes a mobile vehicle communication and control system 10 for a motor vehicle 12. The communication and control system 10 for the vehicle 12 generally includes one or more wireless carrier systems 60, a land communications network 62, a computer 64, a networked wireless device such as a smart phone 57, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel and steering column for illustrative purposes, in some embodiments, the steering system 16 may not include a steering wheel. In various embodiments, the steering system 16 further includes various other column based or rack based features (not depicted in FIG. 1), such as, but not limited to, a steering gear, intermediate connecting shafts between the column and the gear, connection joints, either flexible or rigid, allowing desired articulation angles between the intermediate connecting shafts, and tie-rods. The steering gear, in turn, may comprise a rack, an input shaft, and an internal gearing.

In various embodiments, the steering system 16 is an Electric Power Steering system (EPS) that includes a motor that is coupled to the steering system 16, and that provides torque or force to a rotatable or translational member of the steering system 16 (referred to as assist torque). The motor can be coupled to the rotatable shaft of the steering column or to the rack of the steering gear. The steering system 16 in turn influences the steerable front road wheels 15 during steering based upon the assist torque received from the motor along with any torque received from a driver of the vehicle 12 via the steering wheel. The steering system 16 further includes one or more sensors 26 that sense observable conditions of the steering system 16. In various embodiments, the steering system 16 includes a torque sensor and a position sensor. The torque sensor senses a rotational torque applied to the steering system by for example, a driver of the vehicle 12 via the steering wheel and generates torque signals based thereon. The position sensor senses a rotational position of the steering wheel and generates position signals based thereon.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the smart phone 57. The smart phone 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the smart phone 57 includes a GPS module capable of receiving GPS satellite signals and generating GPS coordinates based on those signals. In other embodiments, the smart phone 57 includes cellular communications functionality such that the smart phone 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the smart phone 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communications system 28 of the vehicle 12 with a number of different system functions, such as storage of account information and storage and management of vehicle diagnostic information via one or more networked databases. The databases can store account information such as subscriber authentication information, vehicle identifiers, profile records, behavioral patterns, and other pertinent subscriber information. Data transmissions may also be conducted by wireless systems, such as 802.11x, GPRS, and the like. The remote access center 78 can utilize an automated advisor or a live advisor to provide instructions or other information to the vehicle via the wireless communication system 28.

Figure 2:
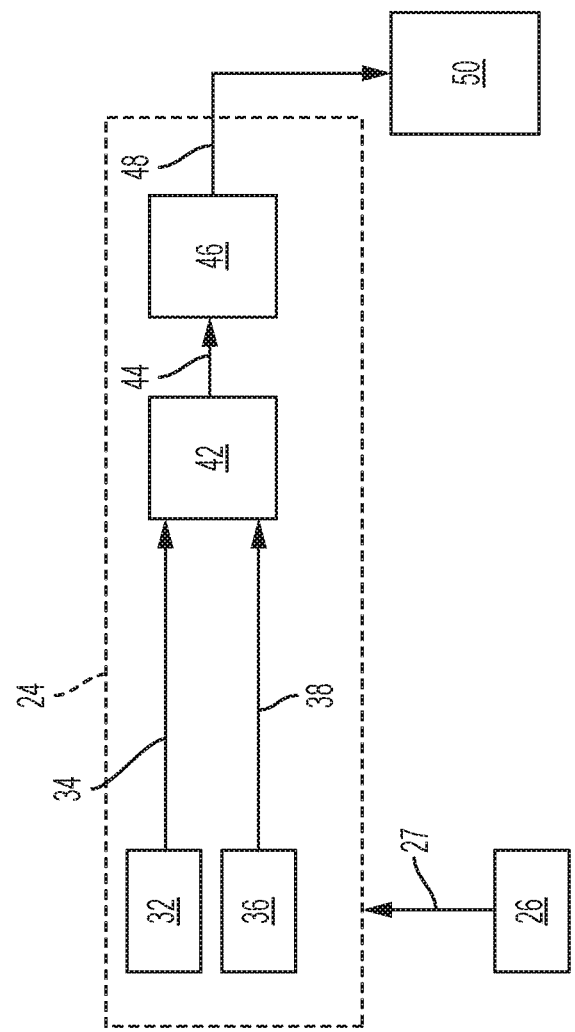
FIG. 2 is a schematic block diagram of an automated driving system (ADS) for a vehicle, according to an embodiment.

As shown in FIG. 2, the ADS 24 includes multiple distinct control systems for determining the presence, location, classification, and path of detected features or objects in the vicinity of the vehicle. The ADS 24 is configured to receive inputs from a variety of sensors, such as the sensors 26 illustrated in FIG. 1, and synthesize and process the sensor inputs to generate parameters used as inputs for other control algorithms of the ADS 24.

The ADS 24 includes a sensor fusion module 32 for determining the presence, location, and path of detected features in the vicinity of the vehicle. The sensor fusion module 32 is configured to receive inputs 27 from a variety of sensors, such as the sensors 26 illustrated in FIG. 1. The sensor fusion module 32 processes and synthesizes the inputs from the variety of sensors and generates a sensor fusion output 34. The sensor fusion output 34 includes various calculated parameters including, but not limited to, a location of a detected obstacle relative to the vehicle, a predicted path of the detected obstacle relative to the vehicle, and a location and orientation of traffic lanes relative to the vehicle.

The ADS 24 also includes a mapping and localization module 36 for determining the location of the vehicle and route for a current drive cycle. The mapping and localization module 36 is also configured to receive inputs from a variety of sensors, such as the sensors 26 illustrated in FIG. 1. The mapping and localization module 36 processes and synthesizes the inputs from the variety of sensors, and generates a mapping and localization output 38. The mapping and localization output 38 includes various calculated parameters including, but not limited to, a vehicle route for the current drive cycle, and a current vehicle location relative to the route.

The primary control system 30 additionally includes a path planning module 42 for determining a vehicle path to be followed to maintain the vehicle on the desired route while obeying traffic laws and avoiding any detected obstacles. The path planning module 42 employs a first obstacle avoidance algorithm configured to avoid any detected obstacles in the vicinity of the vehicle, a first lane keeping algorithm configured to maintain the vehicle in a current traffic lane, and a first route keeping algorithm configured to maintain the vehicle on the desired route. The path planning module 42 is configured to receive the sensor fusion output 34 and the mapping and localization output 38. The path planning module 42 processes and synthesizes the sensor fusion output 34 and the mapping and localization output 38, and generates a path planning output 44. The path planning output 44 includes a commanded vehicle path based on the vehicle route, vehicle location relative to the route, location and orientation of traffic lanes, and the presence and path of any detected obstacles.

The ADS 24 further includes a vehicle control module 46 for issuing control commands to vehicle actuators. The vehicle control module employs a first path algorithm for calculating a vehicle path resulting from a given set of actuator settings. The vehicle control module 46 is configured to receive the path planning output 44. The vehicle control module 46 processes the path planning output 44 and generates a vehicle control output 48. The vehicle control output 48 includes a set of actuator commands to achieve the commanded path from the vehicle control module 46, including but not limited to a steering command, a shift command, a throttle command, and a brake command.

The vehicle control output 48 is communicated to actuators 30. In an exemplary embodiment, the actuators 30 include a steering control, a shifter control, a throttle control, and a brake control. The steering control may, for example, control the steering system 16 as illustrated in FIG. 1. The shifter control may, for example, control a transmission 14 as illustrated in FIG. 1. The throttle control may, for example, control a propulsion system 12 as illustrated in FIG. 1. The brake control may, for example, control wheel brakes 20 as illustrated in FIG. 1.

It should be understood that the disclosed methods can be used with any number of different systems and is not specifically limited to the operating environment shown here. The architecture, construction, setup, and operation of the system 10 and its individual components is generally known. Other systems not shown here could employ the disclosed methods as well.

Figure 3:
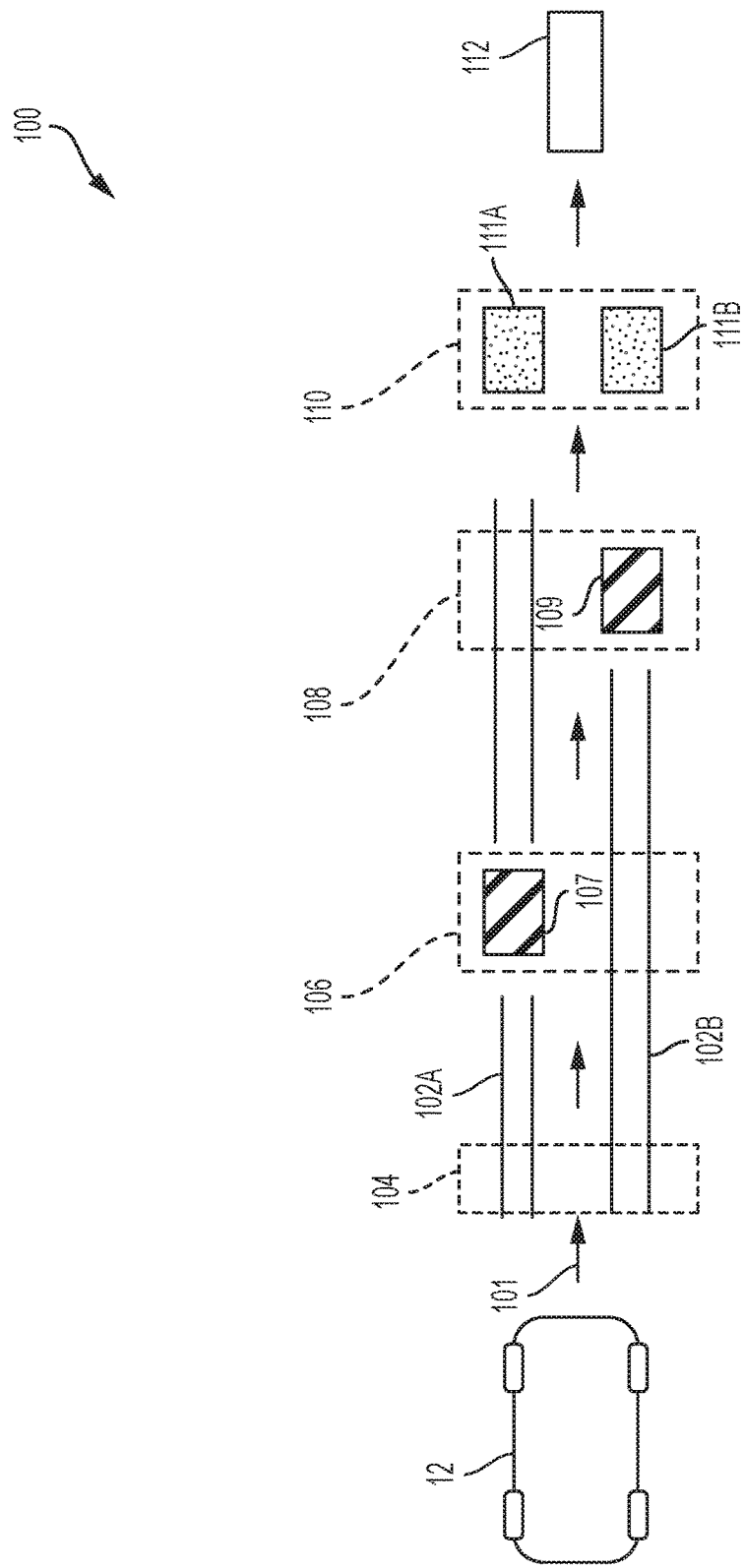
FIG. 3 is a schematic diagram of a test rig to enable independent validation of vehicle steering systems, according to an embodiment.

FIG. 3 illustrates a test rig 100 for independently verifying vehicle steering system 16 health and functionality to identify steering component degradation, according to an embodiment. As the vehicle 12 progresses through the test rig 100, one or more tests are performed to assess vehicle steering functionality and health. Applying mechanical load first to one traction wheel and then to the other traction wheel places the steering components of each traction wheel under tensile, compressive, or torque stress and isolates a possible condition with one or more of the steering components to enable more accurate detection of the condition. To initiate the testing procedure, the vehicle 12 travels in a forward direction, as indicated by arrows 101, and approaches a start box or area 104. As the vehicle 12 travels in direction 101, the wheels 15 pass between one of a pair of staggered rails 102A, 102B. The vehicle wheels 15 on a left or driver side of the vehicle 12 pass between the rails 102A and the vehicle wheels 15 on a right or passenger side of the vehicle 12 pass between the rails 102B. The staggered rail pairs 102A, 102B align the vehicle wheels 15 on each side of the vehicle 12 such that the vehicle 12 travels in a controlled, straight line through the test rig 100. The staggered rail pairs 102A, 102B also maintain alignment of the vehicle 12 as the vehicle enters each test area, as discussed below.

As the vehicle 12 enters the start box or area 104, the vehicle triggers initiation of the test procedure. Initiation of the test procedure may be, for example and without limitation, passing over a weight-sensing plate or entering an area otherwise configured to sense the vehicle 12 (that is, by visual identification, audible identification, sensing an electrical signal emitted by the vehicle 12, etc.) or entering a known coordinate location. As the vehicle 12 approaches or enters the start box or area 104, or, alternatively, a sensing system in the start box or area 104 senses the approach or presence of the vehicle 12, the ADS 24 of the vehicle 12 receives a signal to initiate the test sequence. The signal is received from, for example, a control system electrically connected to the start box 104 or is triggered by location or proximity information obtained from the various sensors 26 of the vehicle 12.

After reception of the signal triggering the test sequence, the vehicle 12 proceeds toward area 106. The vehicle 12 may proceed forward under its own power, as guided by the ADS 24, or may be guided forward by a wedge or other system that pushes the wheels 15 forward through the rail pairs 102A, 102B. Area 106 defines a first testing area including an air bearing 107. When the vehicle enters the area 106, the left-side traction wheel 15 is positioned over the air bearing 107. The air bearing 107 can be any type of low friction surface that allows free movement of the left-side traction wheel 15 as the wheel 15 is turned or torqued left and right during the test. Initiation of the test at area 106 occurs through reception of a signal indicating correct vehicle positioning within the area 106, that is, the left-side traction wheel 15 positioned over the air bearing 107 and the right-side traction wheel 15 positioned between the rails 102B. Similar to the signal discussed above to indicate that the vehicle 12 is at the start area 104, the signal to initiate the test at area 106 may be received by the ADS 24 from, for example, a control system electrically connected to the air bearing 107 of the area 106 or may be triggered by location or proximity information obtained from the various sensors 26 of the vehicle 12.

As shown in FIG. 3, the left-side traction wheel 15 is positioned over the air bearing 107 while the right-side traction wheel 15 is securely constrained from side-to-side movement by the rails 102B. Constraining one traction wheel 15 while allowing the other traction wheel 15 to be turned left and right directs the steering load through a singular, known mechanical path, in this example, outer ball joints, tie rods, Cardan joints, fasteners, I-shaft, rack bar, steering knuckles and any other mechanical components through which mechanical load is applied to turn the traction wheel 15 positioned on the air bearing. Constraining one traction wheel while allowing full left and right torque of the other traction wheel directs the mechanical load through the steering components of the traction wheel and isolates diagnosis of a possible condition through triangulation of the steering condition during the diagnostic test, as discussed in greater detail below.

Completion of the test at area 106 triggers a signal to the vehicle 12 or to a vehicle movement system that directs the vehicle 12 to proceed in the direction indicated by the arrows 101 to a second test area 108. Similar to the area 106, the area 108 defines a second testing area that includes an air bearing 109. When the vehicle 12 enters the area 108, the right-side traction wheel 15 is positioned over the air bearing 109. Similar to the air bearing 107, the air bearing 109 can be any type of low friction surface that allows free movement of the right-side traction wheel 15 as the wheel 15 is turned or torqued left and right during the test. As shown in FIG. 3, the right-side traction wheel 15 is positioned over the air bearing 109 while the left-side traction wheel 15 is securely constrained from side-to-side movement by the rails 102A. Initiation of the test at area 108 occurs through reception of a signal indicating correct vehicle positioning within the area 108, that is, the right-side traction wheel 15 positioned over the air bearing 109 and the left-side traction wheel 15 positioned between the rails 102A. Similar to the signal discussed above to indicate that the vehicle 12 is at the start area 104, the signal to initiate the test at area 108 may be received by the ADS 24 from, for example, a control system electrically connected to the air bearing 109 of area 108 or may be triggered by location or proximity information obtained from the various sensors 26 of the vehicle 12.

Completion of the test at area 108 triggers a signal to the vehicle 12 or to a vehicle movement system that directs the vehicle to proceed in the direction indicated by the arrows 101 to a third test area 110. The test area 110 defines a third testing area that includes two controlled friction surfaces 111A, 111B to allow both of the left- and right-side traction wheels 15 to be fully traction left and right through a full steering angle range under mechanical load. When the vehicle 12 enters the area 110, the left-side traction wheel 15 is positioned over the surface 111A and the right-side traction wheel 15 is positioned over the surface 111B. Once the traction wheels 15 of the vehicle 12 are in position over the respective surface 111A, 111B, initiation of the test at area 110 occurs through reception of a signal indicating correct vehicle positioning within the area 110, that is, the left-side traction wheel 15 positioned on the controlled friction surface 111A and the right-side traction wheel 15 positioned on the controlled friction surface 111B. Similar to the signals discussed above to indicate that the vehicle 12 is at the start area 104, at the first test area 106, or at the second test area 108, the signal to initiate the test at area 110 may be received by the ADS 24 from, for example, a control system electrically connected to one or more of the controlled friction surfaces 111A, 111B of area 110 or may be triggered by location or proximity information obtained from the various sensors 26 of the vehicle 12.

Completion of the test at area 110 triggers a signal to the vehicle 12 or to a vehicle movement system that directs the vehicle 12 to proceed further in the direction indicated by arrows 101 to exit the test rig 100. Data on steering system 16 health and functionality, including but not limited to steering torque and steering angle, for example, obtained from the various sensors 26, is transmitted to a remote database (that is, a database not on the vehicle 12) and/or to a vehicle control system or controller 22 for processing and analysis, as discussed in greater detail below.

Figure 4:
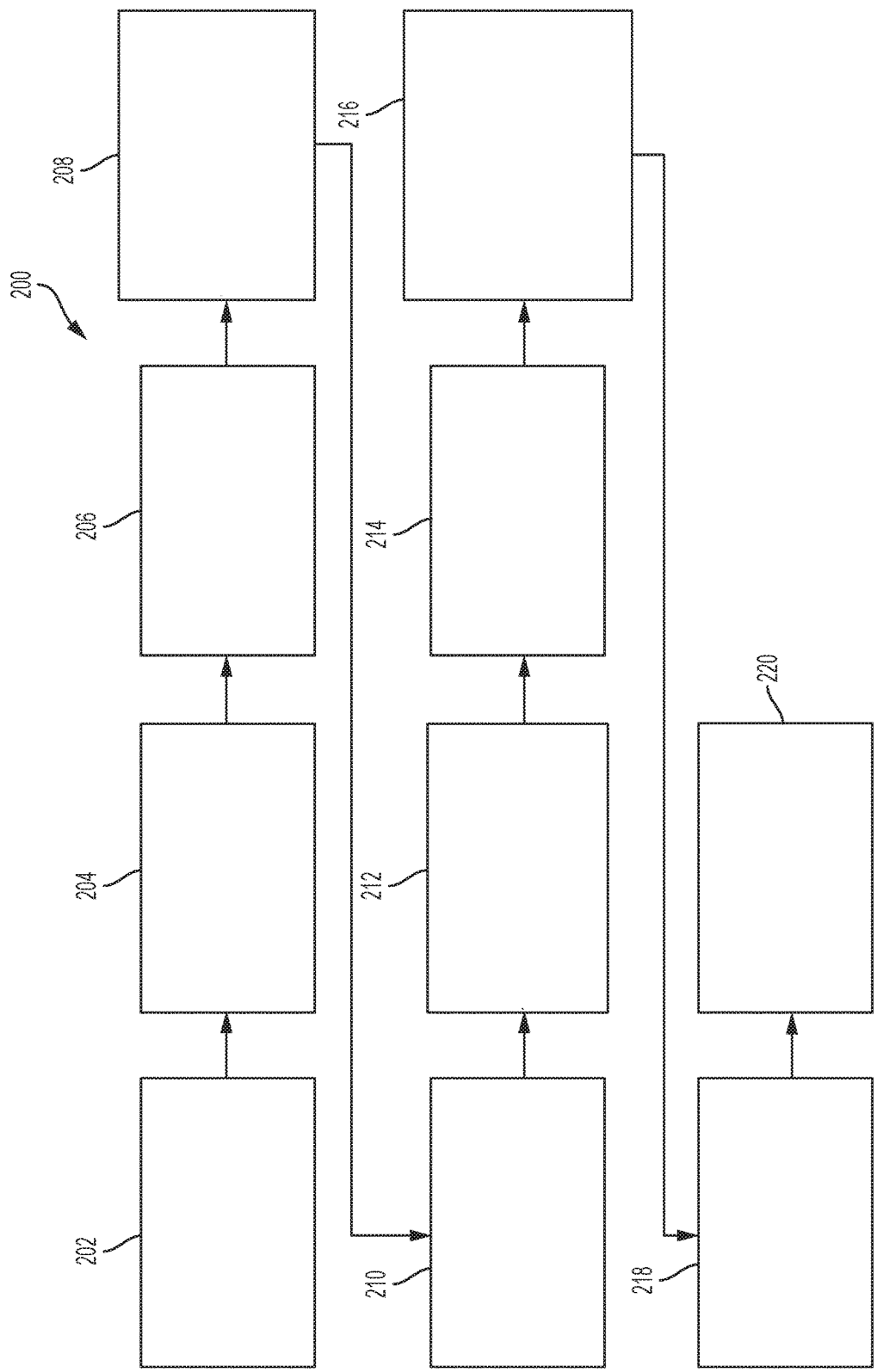
FIG. 4 is a flow chart of a set of test procedures to verify vehicle steering function, according to an embodiment.

FIG. 4 is a flow chart of a method 200 illustrating the steering system 16 health and functionality evaluation process discussed above with respect to the test rig 100 discussed in FIG. 3. The method 200 can be utilized in connection with the vehicle 12, which may be an autonomous vehicle, and the test rig 100, in accordance with exemplary embodiments. As can be appreciated in light of the disclosure, the order of operation within the method 200 is not limited to the sequential execution as illustrated in FIG. 4, but may be performed in one or more varying orders as applicable and in accordance with the present disclosure.

As discussed above, test areas 106 and 108 allow independent testing of each of the left- and right-side traction wheels 15 while the other of the left- and right-side traction wheel 15 is constrained from lateral or left or right steering movement by one the respective set of rail pairs 102A, 102B. At 202, the vehicle 12 is guided between the pairs of rails 102A, 102B. Each of the pairs of rails 102A, 102B can have a splayed rail configuration such that the ends of each of the pairs of rails 102A, 102B are laterally spread apart to widen a distance between each of the pairs of rails 102A, 102B. A sensor pad or other indicator may be placed at the ends of each of the pairs of rails 102A, 102B to generate a signal when the wheels 15 of the vehicle 12 pass between the respective pair of rails 102A, 102B. At 204, the vehicle 12 proceeds forward, as indicated by arrows 101 in FIG. 3, and stops at the start area 104. A signal is generated to initiate the test sequence. As discussed above, the initiation signal may be generated by a weight signal, an infrared signal, visible or auditory detection of the vehicle 12, or location or proximity information obtained from one or more of the sensors 26 of the vehicle 12.

At 206, the vehicle 12 pulls forward, in the direction of the arrows 101 shown in FIG. 3, towards and into the test area 106. Next, at 208, when the vehicle 12 is positioned correctly within the test area 106 the electric power steering of the vehicle 12 is commanded to apply a mechanical load to the left-side traction wheel 15. The EPS of vehicle 12 applies left and then right torque to the left-side traction wheel 15 at a rate of 1.0 Nm/sec to peak torque levels of +/−5 Nm. Correct positioning of the vehicle 12 within the test area 106 occurs when the left-side traction wheel is positioned on the air bearing 107 and the right-side traction wheel 15 is constrained between the rails 102B. Sensors 26 on the vehicle 12 measure condition data corresponding to at least one current steering system operating condition, such as, for example, the steering torque and steering angle of the wheel 15 positioned on the air bearing 107 during the test performed at test area 106. The data from the sensors 26 is stored on board the vehicle 12 in the controller 22 or transmitted to a remote database, such as the computer 64 shown in FIG. 1 via the wireless communication system 28 of the vehicle 12.

Next, at 210, the vehicle continues to proceed forward in the direction of the arrows 101 toward the test area 108. At 212, when the vehicle is positioned correctly within the test area 108, the electric power steering of the vehicle 12 is commanded to apply a mechanical load to the right-side traction wheel 15. The EPS applies left and then right torque to the right-side traction wheel 15 at a rate of 1.0 Nm/sec to peak torque levels of +/−5 Nm. Correct positioning of the vehicle 12 within the test area 108 occurs when the right-side traction wheel 15 is positioned on the air bearing 109 and the left-side traction wheel 15 is constrained between the rails 102A. Sensors 26 on the vehicle 12 measure condition data corresponding to at least one current steering system operating condition, such as, for example, the steering torque and steering angle of the tested wheel 15 positioned on the air bearing 109 during the test performed at test area 108. The data from the sensors 26 is stored on board the vehicle 12 in the controller 22 or transmitted to the computer 64.

At 214, the vehicle continues to proceed forward in the direction of the arrows 101 toward the test area 110. Next, at 216, when the vehicle is positioned correctly within the test area 110, a third test is performed wherein the electric power steering of the vehicle 12 is commanded to apply a mechanical load to both of the left- and right-side traction wheels 15. The EPS applies left and then right torque at a rate of 1.0 Nm/sec to peak motor torque capability. Correct positioning of the vehicle 12 within the test area 108 occurs when the left- and right-side traction wheels 15 are positioned on the respective controlled friction surfaces 111A, 111B. Sensors 26 on the vehicle 12 measure condition data corresponding to at least one current steering system operating condition, such as, for example, steering motor torque and steering motor current. Following capture of the third test data, at 218, data from the third test is transferred to the computer 64. If not previously transferred, data from the tests performed at 208 and 212 is also transferred to the computer 64. At 218, the computer 64 or the on board controller 22 performs a vehicle steering system analysis using the data obtained from the sensors 26 during each of the three tests performed on the steering system to determine a health and functionality status of the steering system as a whole as well as the functionality of at least one component of the steering system. The steering system diagnosis obtained through analysis of the sensor data may be stored on the computer 64 as diagnostic information or transmitted to the remote access center 78 for further analysis. Analysis of the sensor data also includes checking for at least one service condition of the steering system. The analysis may generate a diagnostic code that is transmitted to a service center if the diagnosis indicates the vehicle 12 should be serviced. If the vehicle 12 is an autonomous vehicle, the vehicle 12 is instructed to proceed to the service center if the diagnosis indicates the vehicle 12 should be serviced.

Figure 5:
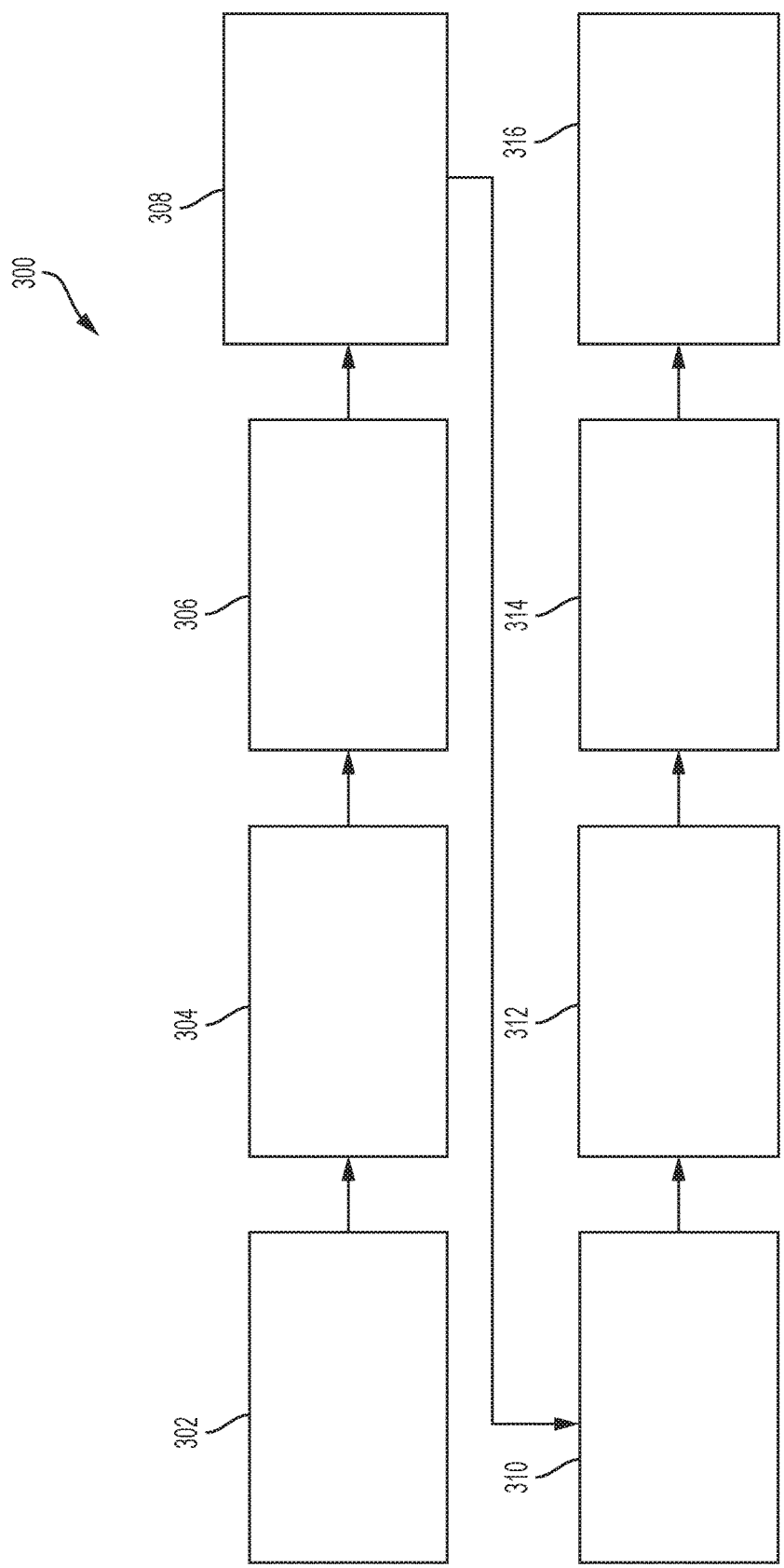
FIG. 5 is a flow chart of a test procedure and analysis sequence to independently validate one side or wheel of a vehicle steering system, according to an embodiment.

FIG. 5 is a flow chart of a method 300 illustrating the steering system 16 health and functionality evaluation process performed at 208 and 212 in the overall test procedure 200 discussed above with reference to FIG. 4. The method 300 can be utilized in connection with the vehicle 12 and the test rig 100, in accordance with exemplary embodiments. As can be appreciated in light of the disclosure, the order of operation within the method is not limited to the sequential execution as illustrated in FIG. 5, but may be performed in one or more varying orders as applicable and in accordance with the present disclosure.

As discussed above, the method 300 is performed at each of the test areas 106, 108 to isolate the steering load path to more accurately diagnose any issues with each side of the steering system. As depicted in FIG. 5, at 302, the electric power steering system is commanded to apply left and then right torque at a rate of 1.0 Nm/sec to peak torques of +/−5 Nm. Next, at 304, sensors, such as sensors 26, collect data related to characteristics or current operating conditions of the steering system, for example and without limitation, the steering wheel angle, steering motor torque, and steering motor current as the torque is applied to the tested wheel 15. The steering data obtained from the sensors 26 at 304 is used at 306 to calculate the steering load path stiffness. The steering load path stiffness determined at 304 is used to calculate the kinematic hysteresis of the steering system at 308.

From the kinematic hysteresis determined at 308 and the data obtained by the sensors 26 on the steering wheel angle, steering motor torque, and steering motor current, checks are performed for characteristic service conditions at 310, 312, and 314. While illustrated as performed consecutively, the checks performed at 310, 312, and 314 may be performed in any order or may be performed simultaneously. At 310, a check for excess stiffness in the tested side of the vehicle steering system is performed. Excess stiffness in a vehicle steering system may indicate a possible issue with the motor of the electric power steering system, possible seized or frozen steering components, or a low level of power steering fluid. A check for asymmetry in the vehicle steering system is performed at 312. Asymmetry in the vehicle steering system may indicate possible conditions with the tie rods, outer ball joints, steering knuckles, or other connective components of the steering system. Finally, at 314, a check for stick-slip in the vehicle steering system is performed. Stick-slip is a spontaneous jerking motion that can occur when two objects slide over each other. Stick-slip can be described as surfaces alternating between sticking to each other and sliding over each other due to differences between the static and dynamic coefficient of friction. Stick-slip is undesirable in a vehicle steering system due to undesirable jerking or movement during turning maneuvers that may be felt by the operator or passenger. Once the checks performed at 310, 312, and 314 are complete, the method 300 proceeds to 316 where the data is stored on board the vehicle 12 and/or transmitted to the remote computer 64 and the method 300 is complete.

FIG. 6 is a flow chart of a method 400 illustrating the steering system health and functionality evaluation process performed at 210 of the overall test procedure 200 discussed with reference to FIG. 4. The method 400 can be utilized in connection with the vehicle 12 and the test rig 100, in accordance with exemplary embodiments. As can be appreciated in light of the disclosure, the order of operation within the method is not limited to the sequential execution as illustrated in FIG. 6, but may be performed in one or more varying orders as applicable and in accordance with the present disclosure.

As discussed above, the method 400 is performed at test area 110 to measure the steering response of both the left and right sides of the vehicle steering system 16. With reference to FIG. 6, at 402, the electric power steering system is commanded to apply left and then right torque at a rate of 1.0 Nm/sec to peak torques of +/−5 Nm. Next, at 404, sensors, such as sensors 26, collect data related to characteristics or current operating conditions of the steering system, for example and without limitation, the steering wheel angle, steering motor torque, and steering motor current as the torque is applied to both of the left and right side traction wheels 15. The steering system 16 data obtained from the sensors 26 at 404 is used at 406 to calculate the torque ripple magnitude. Torque ripple is an effect seen in many electric motor designs and refers to a periodic increase or decrease in output torque as the motor shaft rotates. The torque ripple magnitude is the difference in the maximum and minimum torque over one complete revolution of the motor shaft. The steering system 16 data obtained from the sensors 26 at 404 is further used to calculate a peak steering angle achieved for both left and right steering at 408. At 410, the peak motor torque achieved is calculated. Calculation of the curvature in the motor output for both turn directions is performed at 412. While illustrated as performed consecutively, the calculations performed at 408, 410, and 412 may be performed in any order or may be performed simultaneously. After performing the calculations outlined at 408, 410, and 412, the method 400 proceeds to 414 where the data is stored on board the vehicle 12 and/or transmitted to the remote computer 64 and the method 400 is complete.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of verifying health and functionality of a steering system of a vehicle, the vehicle steering system including a first traction wheel, a second traction wheel, and at least one sensor, the method comprising:
    positioning the vehicle with the first traction wheel on a first bearing surface and the second traction wheel within a first constraint;
    applying a first mechanical load to the first traction wheel;
    receiving, from the at least one sensor, first data corresponding to a first steering system condition;
    positioning the vehicle with the first traction wheel within a second constraint and the second traction wheel on a second bearing surface;
    applying a second mechanical load to the second traction wheel;
    receiving, from the at least one sensor, second data corresponding to a second steering system condition;
    positioning the vehicle with the first and second traction wheels on respective first and second friction surfaces;
    applying a third mechanical load to the first and second traction wheels;
    receiving, from the at least one sensor, third data corresponding to a third steering system condition;
    transmitting the first, second, and third data to a processor; and
    determining, via the processor, a health status of the steering system based on the first, second, and third data.

2. The method of claim 1, wherein the first, second, and third steering system conditions include one or more of a steering wheel angle, a steering motor torque, and a steering motor current.

3. The method of claim 1, wherein the first, second, and third data indicate current operating conditions of the steering system of the vehicle.

4. The method of claim 1, wherein determining the health status of the steering system comprises determining a functionality of at least one component of the steering system.

5. The method of claim 1, further comprising processing the first data to determine a first steering load path stiffness.

6. The method of claim 5, further comprising processing the second data to determine a second steering load path stiffness.

7. The method of claim 6, further comprising processing the third data to determine one or more of a motor torque ripple magnitude, a peak steering angle, and a peak motor torque.

8. The method of claim 7, wherein determining the health status of the steering system comprises checking for at least one service condition of the steering system.

9. The method of claim 8, wherein the at least one service condition includes excess stiffness, asymmetry of the steering system, and stick-slip.

10. The method of claim 9, further comprising generating a diagnostic code if at least one service condition is detected.

11. The method of claim 1, wherein the first constraint includes a first pair of parallel rails, the second constraint includes a second pair of parallel rails, and the first pair of rails is laterally spaced apart from and parallel to the second pair of rails.

12. A device to verify health and functionality of a vehicle steering system, comprising:
    a first pair of parallel rails and a second pair of parallel rails, wherein the first pair of rails is laterally spaced apart from and parallel to the second pair of rails, the first pair of rails defining a first wheel path and the second pair of rails defining a second wheel path, each of the first wheel path and the second wheel path extending in a longitudinal direction;
    a first bearing surface aligned with the first wheel path and interrupting the first pair of rails such that the first pair of rails are discontinuous;
    a second bearing surface aligned with the second wheel path and interrupting the second pair of rails such that the second pair of rails are discontinuous, the second bearing surface longitudinally and laterally offset from the first bearing surface; and
    a first friction surface and a second friction surface, wherein the first friction surface is positioned along the first wheel path and longitudinally spaced from the first bearing surface and the second friction surface is positioned along the second wheel path and longitudinally spaced from the second bearing surface and the first and second friction surfaces are longitudinally aligned.

13. The device of claim 12, wherein the first bearing surface defines a first test area and the second bearing surface defines a second test area.

14. The device of claim 13, wherein the first and second friction surfaces define a third test area.

15. The device of claim 14, further comprising a controller configured to generate a signal when the vehicle is positioned in the first test area to instruct the vehicle to apply a first mechanical load to the steering system.

16. The device of claim 15, wherein the controller is configured to generate a signal when the vehicle is positioned in the second test area to instruct the vehicle to apply a second mechanical load to the steering system.

17. The device of claim 16, wherein the controller is configured to generate a signal when the vehicle is positioned in the third test area to instruct the vehicle to apply a third mechanical load to the steering system.

18. An autonomous vehicle configured to autonomously perform a method of verifying health and functionality of a steering system of the vehicle, the steering system comprising a first traction wheel, a second traction wheel, and at least one sensor, the method comprising:
    positioning the vehicle within a first test area, wherein the first traction wheel is constrained from lateral movement;
    applying a first mechanical load to the second traction wheel;
    receiving, from the at least one sensor, first data corresponding to a first characteristic of the steering system;
    positioning the vehicle within a second test area, wherein the second traction wheel is constrained from lateral movement;
    applying a second mechanical load to the first traction wheel;
    receiving, from the at least one sensor, second data corresponding to a second characteristic of the steering system;
    positioning the vehicle within a third test area, wherein both of the first and second traction wheels are steerable;
    applying a third mechanical load to the first and second traction wheels;
    receiving, from the at least one sensor, third data corresponding to a third characteristic of the steering system;
    transmitting the first, second, and third data to a processor; and determining, via the processor, a health status of the steering system based on the first, second, and third data.

19. The autonomous vehicle of claim 18, wherein the characteristic of the steering system includes a steering wheel angle, a steering motor torque, and a steering motor current.

20. The autonomous vehicle of claim 18, wherein positioning the vehicle within the first test area comprises positioning the first traction wheel between a first pair of rails and positioning the vehicle within the second test area comprises positioning the second traction wheel between a second pair of rails.

* * * * *